No. 705,579. Patented July 29, 1902.
J. GIBSON.
EDUCATIONAL CARD.
(Application filed June 3, 1901.)

(No Model.)

Witnesses:
J B Weir
Wad Perry

Inventor
Josiah Gibson.
By Raymond & Barnett
Attys.

UNITED STATES PATENT OFFICE.

JOSIAH GIBSON, OF PARKRIDGE, ILLINOIS.

EDUCATIONAL CARD.

SPECIFICATION forming part of Letters Patent No. 705,579, dated July 29, 1902.

Application filed June 3, 1901. Serial No. 62,914. (No model.)

*To all whom it may concern:*

Be it known that I, JOSIAH GIBSON, a citizen of the United States, residing at Parkridge, in the county of Cook and State of Illinois, have invented certain new and useful Improvements in Educational Cards, of which the following is a specification.

The object of my invention is to provide a card or set of cards which will facilitate the teaching and learning of the simpler mathematical combinations; and it is particularly my object to achieve this result by devising a card or set of cards which upon one face shall present or suggest the various primary mathematical problems possible arising from various combinations of two sets of figures, especially the combinations of single numbers and the combinations of numbers containing two figures with single figures, while the opposite face of the card shall indicate each such problem in full with the correct answer or key thereto. These and such other objects as may hereinafter appear are attained by the devices illustrated in the accompanying drawings, in which—

Figure 1:
Figure 3:
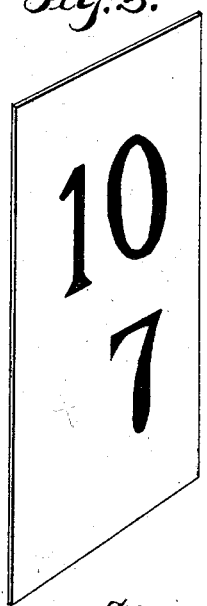
Figure 2:
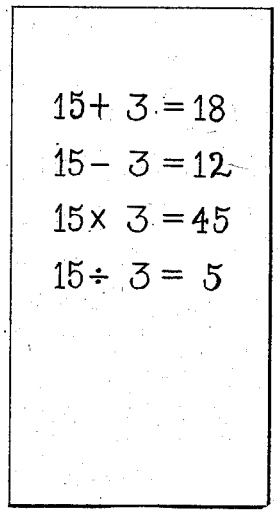
Figure 4:
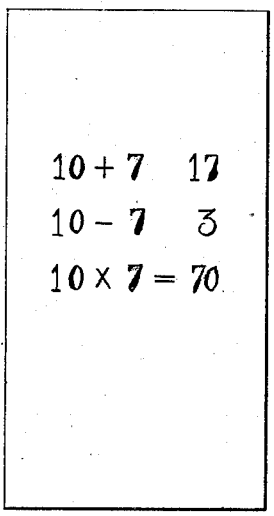

Figures 1 and 3 show the obverse sides of two of the cards invented by me; and Figs. 2 and 4 show the reverse sides of Figs. 1 and 3, respectively.

With my improved cards I present or suggest to the pupil certain mathematical problems or combinations by printing, say, two numbers conspicuously on one side of a card. If, for instance, as shown in Fig. 1, I show the figures "15" and "3" upon one side of a card, they suggest to the pupil the four problems in addition, subtraction, multiplication, and division which are possible by the combination of these two figures. If the pupil is using the card merely as an aid to study, the face of the card presenting or suggesting these problems does not give any key to the proper answer thereto and the pupil is left to his memory and own resources to study out these various combinations; but having arrived at an answer or being unable to arrive at an answer he finds on the reverse side, as shown, for instance, in Fig. 2, a full key to all four of the possible problems. If, however, the card is being used in such a manner that the card is held by a teacher with the obverse or problem side in full sight of the class, so that the pupils have clearly before them the numbers which are to be combined, as the teacher calls upon the class for answers to the different combinations of these two figures the reverse or key side to the card, while hidden from the class, is in full view of the teacher, so that the correct answers are presented to the teacher without the necessity of any effort or thought on the part of the teacher. Although the cards illustrated in the drawings present only the simplest problems, it is obvious that these cards can be used in the same manner to present problems of sufficient complexity to make it quite desirable that the teacher shall have the correct answers before her, so that it will not be necessary for her to give any time or thought to verifying the answers. Although such simple problems by way of multiplication are generally taught to school children by teaching the multiplication-table, so that the answers to these questions in multiplication become familiar to the pupil without stopping to figure out the answer in each case, the combinations of the same figures by way of division, addition, and subtraction are not generally so learned, and it is one purpose of these cards to so present all of the simpler forms of mathematical combinations of such numbers that the pupil will learn to be as familiar with the combinations of division, addition, and subtraction as with those of multiplication.

Of course the particular order in which the figures and answers are arranged is immaterial so long as the problems shall be suggested by the figures on one side of the card and the answers to the different problems or combinations of these same figures shall be set forth upon the opposite side of the card.

As shown, the opposite faces of the card bear the same combination of numbers, one side having the numbers alone, the other having them arranged in connection with their several combinations and the signs used to indicate the method by which the results are obtained. This is of advantage not only in the teaching of the various combinations, but also as to the signs used to indicate the method by which the result is obtained. Furthermore, the presence of the numbers in question on the back of the card aids in facilitating the work, in that there is no requirement of a constant turning of the card to ascertain which numbers are being used. It should also be added that by this means each card bears on its face such data as will enable the student to study the combinations without a requirement of turning the card, thus associating in his mind the several combinations, and by then turning the card he is able to himself ascertain if he has correctly learned the combinations by testing his memory, having nothing but the numbers to guide him.

Having thus described my invention, what I claim, and desire to secure by Letters Patent, is—

1. A device for teaching mathematics, comprising a card bearing on one face numbers suggestive of certain mathematical combinations, and on the opposite face bearing data representing such combinations and the correct answer thereto, said data including the numbers on the first-mentioned face.

2. An educational device for the teaching of mathematics comprising a card having its opposite faces each provided with two numbers, the numbers on each face being similar to those of the opposing face, one of said faces having said numbers arranged to visually indicate mathematical problems and the results obtained in the working of said problems.

JOSIAH GIBSON.

Witnesses:
  O. R. BARNETT,
  M. E. SHIELDS.